United States Patent
Cheon et al.

(10) Patent No.: US 8,391,243 B2
(45) Date of Patent: Mar. 5, 2013

(54) TUNNEL MANAGEMENT METHOD AND APPARATUS FOR REDUCING PACKET LOSSES OF MOBILE NODE IN MOBILE IP ENVIRONMENT

(75) Inventors: Kyung-Yul Cheon, Daejeon (KR); Mi-Jeong Yang, Daejeon (KR); Ae-Soon Park, Daejeon (KR)

(73) Assignees: Electronics and Telecommunications Research Institute, Daejeon (KR); Samsung Electronics Co., Ltd., Suwon-Si, Gyeonggi-Do (KR)

( * ) Notice: Subject to any disclaimer, the term of this patent is extended or adjusted under 35 U.S.C. 154(b) by 363 days.

(21) Appl. No.: 12/808,428

(22) PCT Filed: Dec. 17, 2008

(86) PCT No.: PCT/KR2008/007459
§ 371 (c)(1),
(2), (4) Date: Jun. 16, 2010

(87) PCT Pub. No.: WO2009/078659
PCT Pub. Date: Jun. 25, 2009

(65) Prior Publication Data
US 2010/0265916 A1    Oct. 21, 2010

(30) Foreign Application Priority Data
Dec. 17, 2007  (KR) .................. 10-2007-0132725

(51) Int. Cl.
*H04W 4/00* (2009.01)
(52) U.S. Cl. ........ 370/331; 370/389; 370/431; 455/436; 455/437

(58) Field of Classification Search .................. None
See application file for complete search history.

(56) References Cited

U.S. PATENT DOCUMENTS

| | | | |
|---|---|---|---|
| 7,342,903 B2 * | 3/2008 | O'Neill et al. | 370/331 |
| 8,078,753 B2 * | 12/2011 | Bachmann et al. | 709/238 |
| 2003/0224792 A1 | 12/2003 | Verma et al. | |
| 2004/0047322 A1 | 3/2004 | O'Neill | |
| 2004/0156346 A1 * | 8/2004 | O'Neill | 370/338 |

FOREIGN PATENT DOCUMENTS

| | | |
|---|---|---|
| JP | 2002-237837 | 8/2002 |
| JP | 2006-42248 | 2/2006 |

(Continued)

OTHER PUBLICATIONS

Koodli, R., "Fast Handovers for Mobile IPv6," Nokia Research Center, Network Working Group, Request for Comments: 4068 (2005).

*Primary Examiner* — Jianye Wu
(74) *Attorney, Agent, or Firm* — Nelson Mullins Riley & Scarborough LLP; EuiHoon Lee, Esq.

(57) ABSTRACT

A method is provided for managing a tunnel when a mobile node moves from an existing visiting network to a visiting network which supports a mobile IP. A mobile node may detect a movement of the mobile node, configure a care-of address (CoA) and thereafter transmit a location registration (Binding Update) message to a home agent. The mobile node may create a second tunnel in the visiting network and set the second tunnel as a receiving-only tunnel while maintaining a first tunnel which is already used in the existing visiting network. The mobile node may receive a location registration completion (Binding Acknowledgement) message from the home agent, change the second tunnel to the tunnel capable of transmitting/receiving by modifying a routing table, and cancel the first tunnel.

6 Claims, 5 Drawing Sheets

FOREIGN PATENT DOCUMENTS

| | | |
|---|---|---|
| JP | 2006-222616 | 8/2006 |
| KR | 1020020087907 | 11/2002 |
| KR | 1020030026436 | 4/2003 |
| KR | 1020030041024 | 5/2003 |

* cited by examiner

TUNNEL MANAGEMENT METHOD AND APPARATUS FOR REDUCING PACKET LOSSES OF MOBILE NODE IN MOBILE IP ENVIRONMENT

RELATED APPLICATIONS

This application is a 35 U.S.C. §371 national stage filing of PCT Application No. PCT/KR2008/007459 filed on Dec. 17, 2008, which claims priority to, and the benefit of, Korean Patent Application No. 10-2007-0132725 filed on Dec. 17, 2007. The contents of the aforementioned applications are hereby incorporated by reference.

TECHNICAL FIELD

The present invention relates to a tunnel management method and a tunnel management apparatus of minimizing uplink/downlink packet losses when using a mobile internet protocol (IP) in order to support IP mobility of a mobile node.

The work is supported by the Technology (IT) Research & Development (R&D) program of the Ministry of Information and Communication (MIC) and the Institute for Information Technology Advancement (IITA) [2005-S-404-33, 3G Evolution terminal technology development].

BACKGROUND ART

Mobile IP is a technology for a mobile node which uses IP. When the roaming mobile node is connecting to a remote network, if the mobile node has registered an address, obtained from a current network, to a home agent (HA), a home network transmits data to the mobile node located in the remote network.

A mobile IP standard is comprised of two parts: a mobile IP agent and a mobile node. A mobile IP agent takes charge of a virtual routing service for routing a packet to the registered mobile node.

Figure 1:
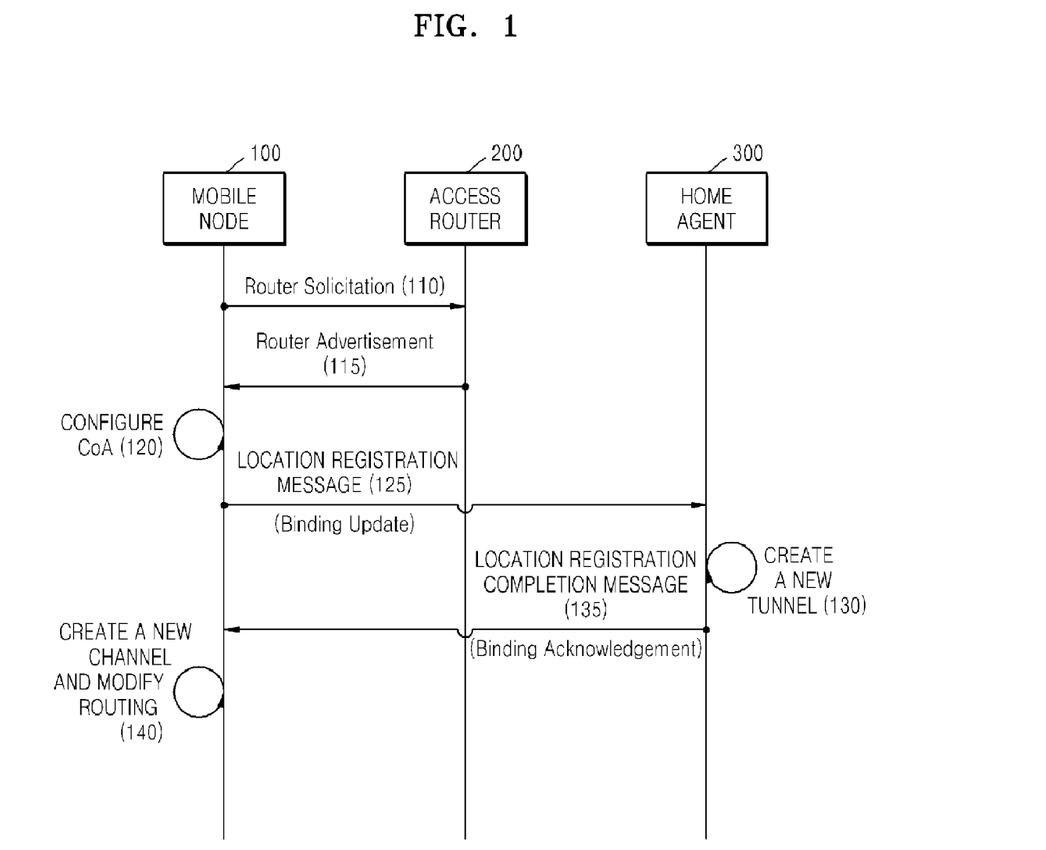
FIG. 1 is a diagram for describing a mobile call process in an existing mobile IP.

The mobile IP is a sort of protocol which registers its own location to a home agent in a home network in order to provide IP mobility when the mobile node moves to a home network or a visiting network as shown FIG. 1. At present, a mobile IP-based handover solution is mainly used in order to support a vertical handover between networks.

DISCLOSURE OF INVENTION

Technical Problem

However, in case of the mobile IP, there is a problem that the packet is lost entirely until a new registration procedure is completed after the mobile node has moved to the visiting network or the home network. That is, the packet, transmitted from a corresponding node of the mobile node, is transmitted to the home network in which the mobile node is originally located, resulting in packet losses until the location registration (Binding Update) message, as shown in operation 125 of FIG. 1, is transmitted to a home agent 300 in order to inform the home agent 300 of the location change of the mobile node after the mobile node has moved to the visiting network, Such packet losses increase when a handover delay occurs due to movement sensing (operations 110 and 115) or acquisition of care-of address (CoA) (operation 120), etc., and thus, in order to prevent the packet losses during the handover of the mobile IP, a fast mobile IP has been proposed.

In the fast mobile IP, the mobile node receives the IP address of the visiting network in advance so as to previously set a new care-of address (a new CoA) and buffers the packet during the handover in an access router 200 of the visiting network. Thus, this protocol can reduce the delays resulting from the movement sensing and the address set time, and thus, prevent the packet losses.

However, even in the case of the fast mobile IP, packet losses essentially occur due to a time lag between the time point when signaling of the handover is completed and the time point when creation of the tunnel in the mobile node is completed.

In the case of the mobile IP, if the mobile node transmits a location registration (Binding Update) message which requests the home network to create a tunnel (operation 125), the home agent 300 receives this message so as to create the tunnel, and thereafter transmits a location registration completion (Binding Acknowledgement) message to a mobile node 100. Then, the created packets are transmitted, together with this message, via the newly created tunnel to the mobile node 100. The mobile node receives the location registration completion message and promptly creates a new tunnel and modifies the routing (operation 140). Then, since the mobile node cannot handle the packets which income between the time point when the location registration message is received and the time point when the establishing of the tunnel is completed, packet losses occur.

Even in the case of the fast mobile IP, the same problem as that of the mobile IP may occur. The fast mobile IP is divided into a predictive mode and a reactive mode according to the time point when the connection to the mobile node is disconnected, in view of a mobile IP standard.

In case of the reactive mode of the fast mobile IP, if the mobile node transmits a location registration (Fast Binding Update) message which requests the home network to create a tunnel, a Previous Access Router (PAR) in the home network creates a new tunnel and transmits an FBack message to the mobile node. The mobile node receives the Fback message, and thereafter, creates a new tunnel and modifies the routing. In the reactive mode of the fast mobile IP, since the FBack message is transmitted together with the packets which are buffered in a New Access Router (NAR), the packet losses can occur in the procedure during which the mobile node receives the FBack message and establishes the new tunnel.

That is to say, the creation of the tunnel and the modification of the routing table must be performed together in the mobile node, after the location registration completion (Binding Acknowledgement) message is transmitted to the mobile node. However, in order to perform this procedure, a lot of time may be required depending on an operating system of the mobile node. In particular, in an operating system in which the modification of the routing table of IPv6 is not provided by an API, for example, Windows XP operating system, this procedure must be executed by system instructions. As a result, a time of a maximum of several hundred milliseconds is required, and the amount of packet loss is increased, accordingly.

In order to solve this problem, there is a method in which the mobile node transmits a location registration (Binding Update or Fast Binding Update) message which requests the home network to create a tunnel and thereafter cancels the existing tunnel and promptly creates a new tunnel. In this case, it is possible to process the packets received by the mobile node after transmitting the location registration completion (Binding Acknowledgement) message, without packet loss.

However, this method also has a problem that even when the handover is not completed, the mobile node previously establishes a new tunnel. That is, more packets can be lost when the location registration completion message is not transmitted or the transmission thereof failed in the home network. In addition, packet losses can occur because uplink packets in the mobile node are transmitted via a newly established tunnel before the handover is completed in the network. That is, in the network, the location registration completion message is received and thereafter the new tunnel is established, however, since the packets are transmitted together with the location registration completion message via the newly established tunnel, there is a problem that the packets are lost during the establishing of the new tunnel.

In the mobile IP as described above, there is a problem that packet losses occur due to a time lag between the time point when the signaling of the handover is completed and the time point when the creation of the tunnel is completed, when the mobile node roams.

Technical Solution

The present invention provides a method of using a receiving-only tunnel, that is, a de-capsulation only tunnel, in order to minimize the packet losses due to a time lag between the time point when signaling of the handover of the mobile node is completed and the time point when creation of the tunnel is completed, in mobile IP.

According to an aspect of the present invention, there is provided a method of managing a tunnel to provide mobile node mobility when the mobile node moves from an existing visiting network to a visiting network which supports a mobile IP, the method comprising: (a) a mobile node detecting a movement of the mobile node and configuring a care-of address (CoA) and thereafter transmitting a location registration (Binding Update) message to a home agent; (b) the mobile node creating a second tunnel in the visiting network and setting the second tunnel as a receiving-only tunnel while maintaining a first tunnel which is already used in the existing visiting network; (c) the mobile node receiving a location registration completion (Binding Acknowledgement) message from the home agent; and (d) the mobile node changing the second tunnel to the normal tunnel capable of transmitting/receiving by modifying a routing table, and deleting the first tunnel.

According to another aspect of the present invention, there is provided a method of managing a tunnel to provide mobile node mobility when a mobile node moves from a home network to a visiting network which supports a mobile IP, the method comprising: the mobile node detecting the movement of the mobile node and configuring a care-of address (CoA) and thereafter transmitting a location registration (Binding Update) message to a home agent; the mobile node creating a receiving-only tunnel; the home agent transmitting a location registration completion (Binding Acknowledgement) message to the mobile node; and the mobile node changing the receiving-only tunnel to the transmitting/receiving tunnel while modifying a routing table.

According to another aspect of the present invention, there is provided a method of managing a tunnel to provide mobile node mobility when a mobile node moves from a visiting network to a home network which supports a mobile IP, the method comprising: a home agent receiving a location registration (Binding Update) message from the mobile node which configures a care-of address (CoA); a home agent setting a tunnel which is already used as a receiving-only tunnel and creating new normal tunnel; the home agent transmitting a location registration completion (Binding Acknowledgement) message to the mobile node; and the home agent deleting the tunnel which is already used as the receiving-only tunnel thereafter (or after a predetermined time).

According to other aspect of the present invention, there is provided a mobile node apparatus for providing mobile node mobility when a mobile node moves from a network which supports a mobile IP to other network, the apparatus comprising: a mobile node management unit detecting a movement of the mobile node and configuring a care-of address; a transmitting/receiving unit transmitting a location registration message to the home agent apparatus and receiving a location registration completion message from the home agent if the movement of the mobile node is detected and the care-of address is configured by the mobile node management unit; a tunnel creation unit creating a new tunnel after transmitting the location registration message in order to reduce packet losses, in addition to the tunnel which is already used; and a tunnel management unit which is capable of managing transmitting/receiving set of the tunnel and deleting the tunnel by giving the priority to a routing route of the packet.

Furthermore, according to other aspect of the present invention, there is provided a home agent apparatus for providing mobile node mobility when a mobile node moves from a network which supports a mobile IP to other network, the apparatus comprising: a transmitting/receiving unit receiving a location registration message from a mobile node apparatus and transmitting a binding acknowledgement message; a tunnel creation unit which is capable of newly creating a tunnel connected to the tunnel which is created by the mobile node apparatus in order to reduce packet losses; and a tunnel management unit which is capable of managing transmitting/receiving set of the tunnel and deleting the tunnel by giving the priority to a routing route of the packet.

Advantageous Effects

DESCRIPTION OF DRAWINGS

The above and other features and advantages of the present invention will become more apparent by describing in detail exemplary embodiments thereof with reference to the attached drawings in which.

BEST MODE

Mode for Invention

The present invention will now be described more fully hereinafter with reference to the accompanying drawings, in which exemplary embodiments of the invention are shown.

This invention may, however, be embodied in many different forms and should not be construed as being limited to the embodiments set forth herein. Rather, these embodiments are provided so that this disclosure will be thorough and complete, and will fully convey the scope of the invention to those skilled in the art. Like numbers refer to like elements throughout the specification.

The present invention suggests a tunnel management method of minimizing packet losses in the case of a mobile IPv6. Of course, in the case of fast mobile IP, receiving-only tunnel establishment and management mechanism can also be similarly applied to a location registration message and a location registration completion message, as required to establish a tunnel.

Hereinafter, the tunnel management method and a tunnel management apparatus in a mobile node which supports the mobile IP, according to an embodiment of the present invention, will now be described in detail. In describing the present invention, when the specific description for a related known technique or a construction makes the gist of the present invention be ambiguous, the detailed description thereof will be omitted. Also, terms as described below are terms that are defined taking account of the functionality in the present invention, and these terms can be varied according to a client or operator, a user's intention or a usage, etc. Therefore, the definition for the terms should be given based on the content of the present specification.

Figure 2:
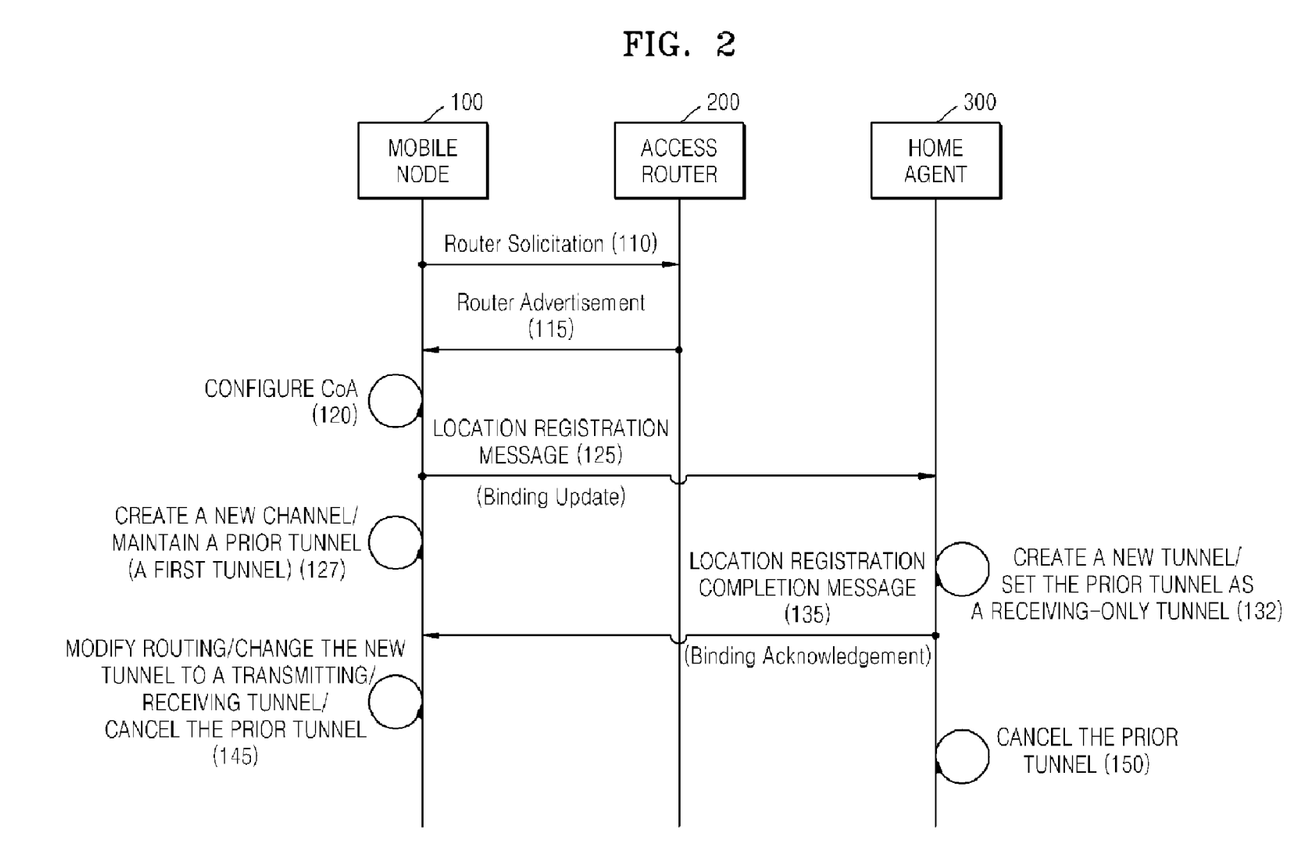
FIG. 2 is a diagram for describing a mobile call process in a mobile IPv6 which manages a receiving-only tunnel, when a mobile node moves from a visiting network to a visiting network, according to an embodiment of the present invention.

FIG. 2 is a diagram for describing a mobile IP call process using receiving-only tunnel management, according to an embodiment of the present invention.

Referring to FIG. 2, a mobile node 100 detects the movement of the mobile node (operations 110 and 115) and sets its address (operation 120, a CoA structure), and thereafter transmits a location registration (Binding Update) message to a home agent 300 (operation 125). Then, a new receiving-only tunnel is created while maintaining the prior tunnel (operation 127). The home agent 300 receives the location registration message, and thereafter creates new tunnel to associate with the new receiving-only tunnel of mobile node and changes the prior tunnel to a receiving-only tunnel (operation 132). Due to the new receiving-only tunnel, the packets of the mobile node, which are transmitted together with the location registration complete message via the new link, can be received without loss.

The home agent 300 transmits a location registration completion (Binding Acknowledgement) message after the prior tunnel is changed to receiving-only tunnel and the new tunnel establishment is completed (operation 135). When the mobile node receives the location registration completion message, the mobile node changes the new receiving-only tunnel to the normal tunnel which is capable of receiving/transmitting data and deleting the prior tunnel (operation 145). For the packets which were transmitted together with the location registration completion message via the new receiving-only tunnel in the home network, since the mobile node previously established the new receiving-only tunnel (operation 127), the mobile node can receive the packets without loss. After a predetermined time is lapsed, the home agent 300 deletes the new receiving-only tunnel (operation 150).

Herein, a method of establishing a tunnel as a receiving-only tunnel is as follows. Priority is given to any one of two steady tunnels, so that the tunnel to which the priority is given becomes the tunnel for outgoing packets. That is, a packet to be transmitted is transmitted only via a specific tunnel (encapsulation) and a packet to be received is received via both tunnels.

That is to say, priority must be given to any one of the prior access router and the prior tunnel associated with the prior access router before the mobile node has roamed and the access router and a new receiving-only tunnel associated with the access router after the mobile node has roamed so as to establish the prior access router and the prior tunnel associated with the prior access router before the mobile node has roamed and the access router and the new receiving-only tunnel associated with the access router after the mobile node has roamed, as the default routing route of the mobile node. A problem resulting from setting the routing route affects only the transmission packet, that is, the encapsulation. As a result, the data to be transmitted can be encapsulated by a specific tunnel and transmitted only via a specific tunnel and the data to be received can be received via both tunnels.

Generally, scenarios by which the mobile node moves to any network are scenarios where the mobile node moves from a home network to the visiting network, from the visiting network to the home network, and from the visiting network to another visiting network.

Figure 3:
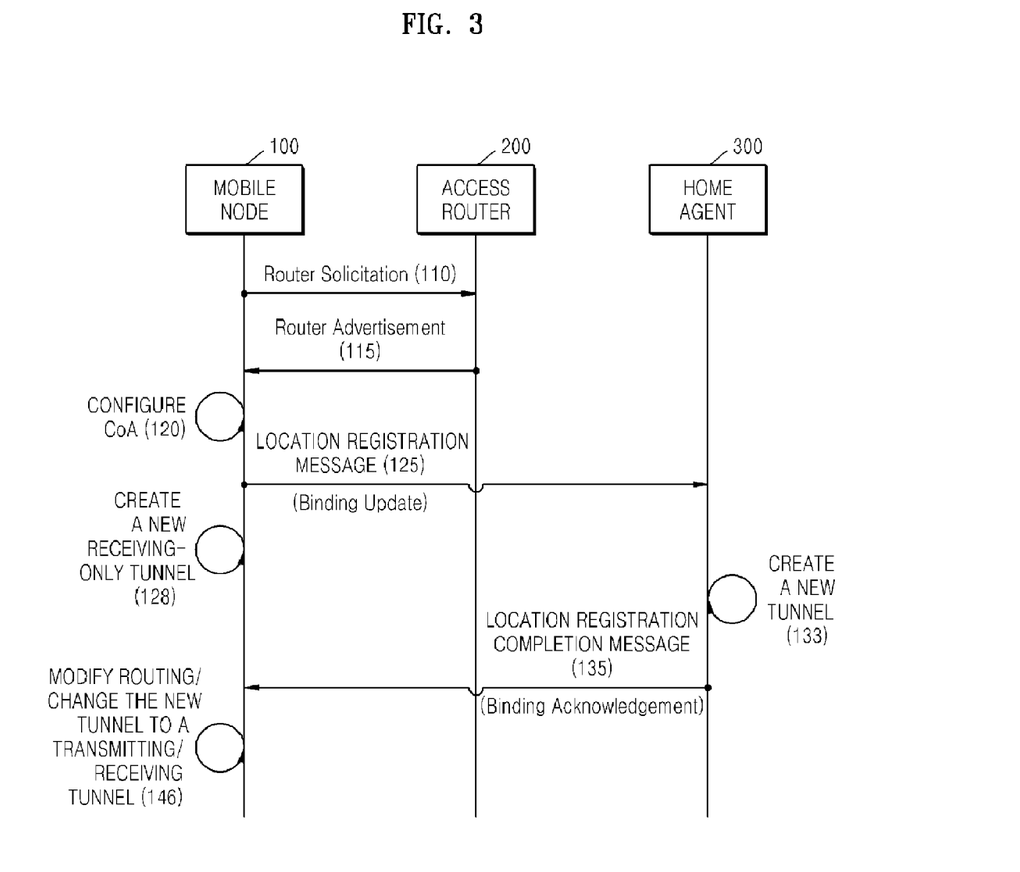
FIG. 3 is a diagram for describing a mobile call process in a mobile IPv6 which operates a receiving-only tunnel when a mobile node moves from a home network to a visiting network, according to an embodiment of the present invention.

In the mobile IP, the case where the prior tunnel and the new receiving-only tunnel exist together as described above is the case where the mobile node moves from the visiting network to another network. In the case where the mobile node moves from the home network to the visiting network, since the prior tunnel does not exist, the same management for the prior tunnel as that described with reference to FIG. 3 is omitted.

That is, as can be seen from FIG. 3, the mobile node 100 transmits the location registration (Binding Update) message to the home agent 300 (operation 125), similarly as described with reference to FIG. 2. Then, the mobile node 100 creates a new receiving-only tunnel only (operation 128). Meanwhile, the home agent 300 creates a new tunnel (operation 133) and transmits a location registration completion (Binding Acknowledgement) message to the mobile node 100 (operation 135). Lastly, the mobile node 100 modifies the routing and changes the new tunnel to the new transmitting/receiving tunnel (operation 146).

Figure 4:
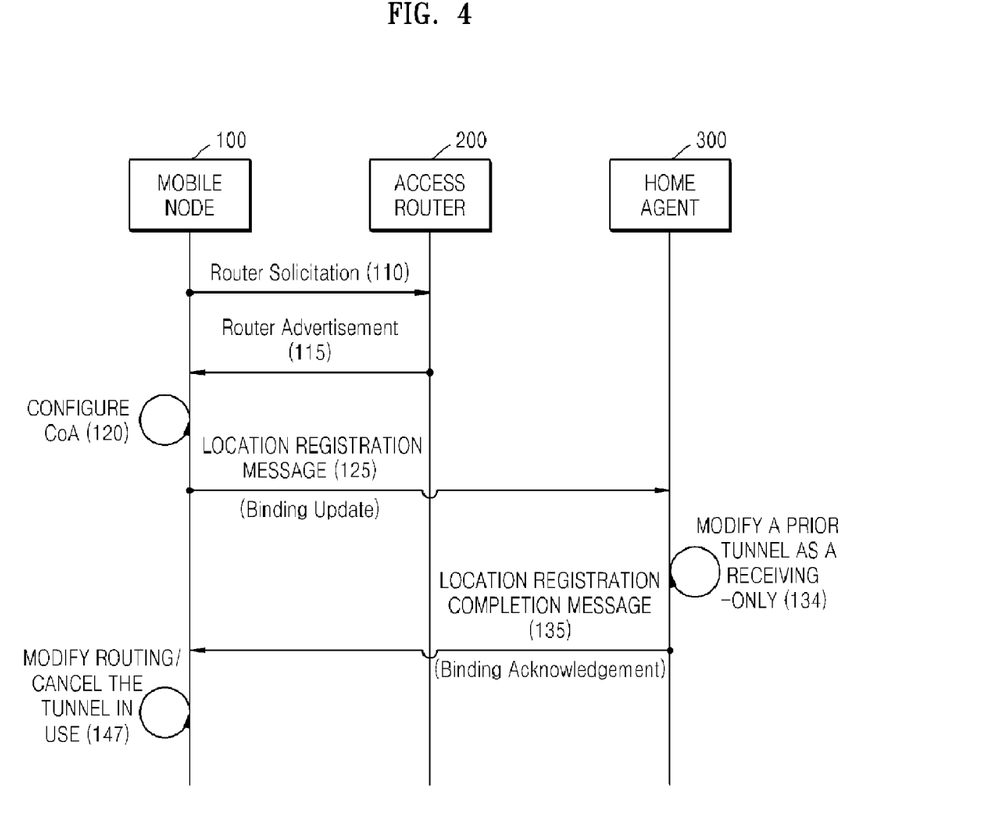
FIG. 4 is a diagram for describing a mobile call process in a mobile IPv6 which operates a receiving-only tunnel when the mobile node moves from the visiting network to the home network, according to an embodiment of the present invention.

In case where the mobile node 100 moves from the visiting network to the home network, since a new tunnel is not required, there is no time required to establish the new tunnel as well. FIG. 4 is a diagram for describing a mobile call process using a receiving-only tunnel, when the mobile node 100 moves from the visiting network to the home network, according to an embodiment of the present invention. In such case, the home agent 300, which received the location registration message from the mobile node 100, establishes the prior tunnel as the receiving-only tunnel and transmits the location registration completion message to the mobile node 100 (operation 135). The mobile node 100 terminates the mobile call process by modifying the routing and deleting the tunnel in use (operation 147). Although the access router 200 and the home agent 300 are described as independent entities in FIG. 4, the home agent 300, in fact, becomes the access router 200 in case where the mobile node 100 moves from the visiting network to the home network.

Figure 5:
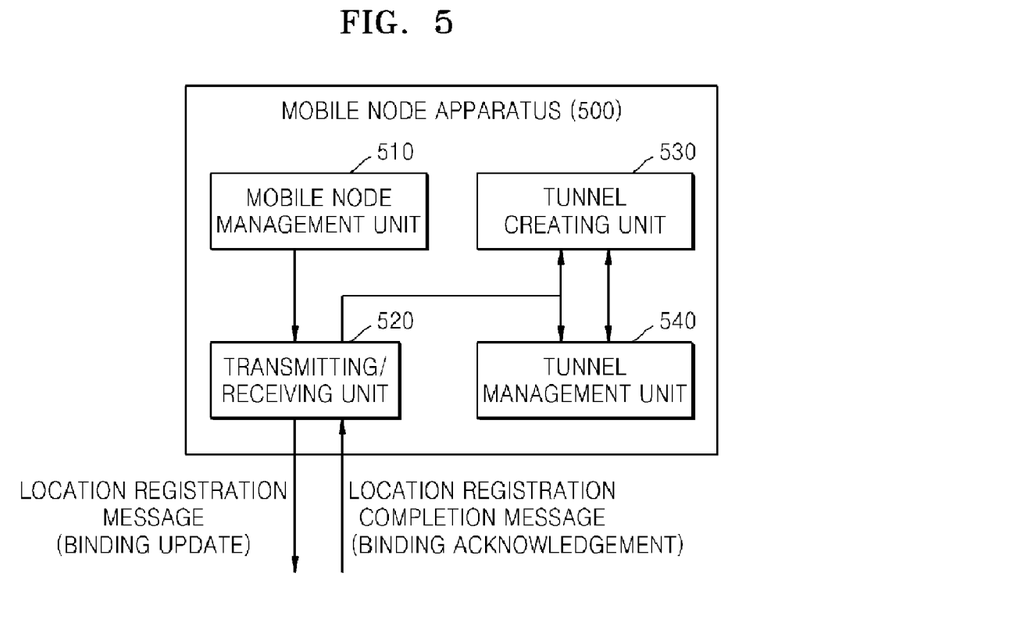
FIG. 5 is a block diagram of a mobile node apparatus according to an embodiment of the present invention.

FIG. 5 is a block diagram of a mobile node apparatus 500 which serves as a tunnel management apparatus to reduce packet losses in the mobile node which supports the mobile IP, according to an embodiment of the present invention.

The mobile node apparatus 500 comprises a mobile node management unit 510 which detects the movement of the mobile node and configures a care-of address (CoA), and a transmitting/receiving unit 520 which transmits the location registration message and receives the location registration completion message from a home agent apparatus 600.

The mobile node apparatus 500 further comprises a tunnel creation unit 530 which transmits the location registration message and thereafter creates a new tunnel in order to reduce packet losses. The tunnel creation unit 530 confirms whether the location registration message was transmitted from the transmitting/receiving unit 520 and thereafter creates the new tunnel in order to reduce the packet losses. The new tunnel can be set as a receiving-only tunnel by the tunnel management unit 540.

If the transmitting/receiving unit 520 receives the location registration completion message from the home agent apparatus 600, the home agent apparatus 600 will also create a new tunnel. Therefore, the mobile node apparatus 500 must modify the routing route and change the transmitting/receiving settings to a tunnel, accordingly. That is, the newly created tunnel must be changed to a tunnel which is capable of transmitting/receiving information. If not so do, it is not possible to cancel the prior tunnel.

Figure 6:
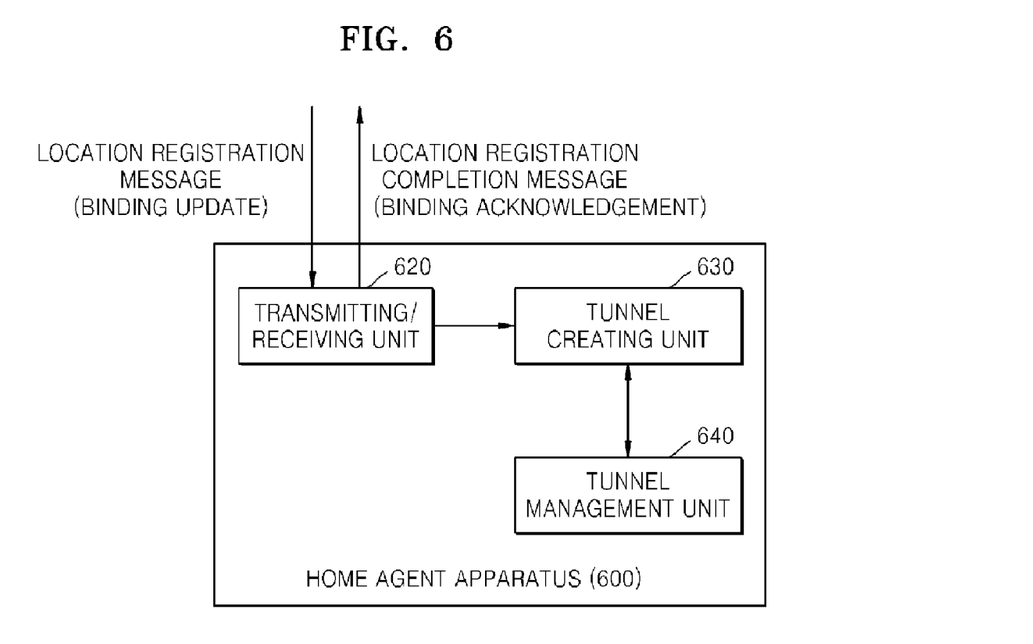
FIG. 6 is a block diagram of a home agent apparatus according to an embodiment of the present invention.

FIG. 6 is a block diagram of the home agent apparatus 600 for reducing packet losses of the mobile node which supports the mobile IP, according to an embodiment of the present invention.

The home agent apparatus 600 must receive the location registration message from the mobile node apparatus 500 and transmit the location registration completion message to the mobile node apparatus. More specifically, a transmitting/receiving unit 620 must receive the location registration message from the mobile node apparatus 500 and transmit the location registration completion message to the mobile node apparatus. If the transmitting/receiving unit 620 receives the location registration message, a tunnel creation unit 630 newly creates a tunnel to connect with the tunnel created by the mobile node apparatus 500, in order to reduce packet losses. If necessary, the prior tunnel can be set as a receiving-only tunnel. The set of the prior tunnel as a receiving-only tunnel as described above, is performed by the tunnel management unit 640. The tunnel management unit 640 performs the function which manages the transmission/reception setting to the tunnel by setting the priority according to the routing route of the packet as described above, as well as the function which generally manages the tunnel by canceling the prior tunnel.

The present invention can be implemented as a computer readable code. The computer readable recording medium comprises all kinds of storage on which all data which is readable by the computer system is stored. The computer readable recording medium is, for example, a read only memory (ROM), a random access memory (RAM), a compact disk (CD) ROM, a magnetic tape, a floppy disk, and optical data storage, and so on, and also comprises a carrier wave, for example, one which is implemented in a form transmitted over the internet. Furthermore, the computer readable recording medium can be distributed in the computer system connected by network and stored and executed, in a distributed scheme, by a code which can be read by the computer.

According to an embodiment of the present invention, the packet losses due to the time lag between the time point when signaling of the handover of the mobile node is completed and the time point when the tunnel is created can be minimized by operating the receiving-only tunnel in the mobile node and home network. The effect obtained by the method as described above varies according to an operating system of the mobile node. In particular, in an operating system in which the time to modify the routing or the time to establish the tunnel is long, such as Windows XP, its effect can be maximized.

While the present invention has been illustrated with reference to the embodiments thereof, however such embodiments is not intended to limit the present invention and is intended to illustrate the present invention. Therefore, it should be understood by a person skilled in the art to which the present invention pertains to that various changes or modifications or coordination against the above embodiments are possible. Accordingly, the scope to be protected by the present invention is defined only by the following claims, and should be construed to cover all the changes or modifications or coordination.

The invention claimed is:

1. A method of managing a tunnel to provide mobile node mobility when a mobile node moves from an existing visiting network to a visiting network which supports a mobile IP, the method comprising:
   (a) detecting, by a mobile node, a movement of the mobile node and configuring a care-of address (CoA) and thereafter transmitting a location registration (Binding Update) message to a home agent;
   (b) creating, by the mobile node, a second tunnel in the visiting network and setting the second tunnel as a receiving-only tunnel while maintaining a first tunnel which is already used in the existing visiting network;
   (c) receiving, by the mobile node, a location registration completion (Binding Acknowledgement) message from the home agent; and
   (d) changing, by the mobile node, the second tunnel to the tunnel capable of transmitting/receiving by modifying a routing table, and canceling the first tunnel.

2. The method of claim 1, wherein the setting of the second tunnel as the receiving-only tunnel involves that the mobile node gives priority to the first tunnel between the first tunnel and the second tunnel so that the second tunnel becomes a receiving-only tunnel, with the first tunnel being used as a routing route for outgoing packets.

3. The method of claim 1, wherein the home agent, after the (b) setting the second tunnel as the receiving-only tunnel, creates a third tunnel which is connected to the second tunnel, and sets the first tunnel which is used by the home agent in the existing visiting network as a receiving-only tunnel, and after (d) the mobile node changing the second tunnel to transmit/receive while modifying the routing table, cancels the first tunnel which is used in the existing visiting network.

4. The method of claim 3, wherein the home agent setting the first tunnel which is used in the existing visiting network as the receiving-only tunnel is that the first tunnel used in the existing visiting network becomes the receiving-only tunnel by giving a priority to the second tunnel among the second tunnel and the first tunnel which is used in the existing visiting network, with the second tunnel being used as a routing route for outgoing packets.

5. A method of managing a tunnel to provide mobile node mobility when a mobile node moves from a home network to a visiting network which supports a mobile IP, the method comprising:
   detecting, by the mobile node, the movement of the mobile node and configuring a care-of address (CoA) and thereafter transmitting a location registration (Binding Update) message to a home agent;
   creating, by the mobile node, a receiving-only tunnel;
   transmitting, by the home agent, a location registration completion (Binding Acknowledgement) message to the mobile node; and
   changing, by the mobile node, the receiving-only tunnel to the tunnel capable of transmitting/receiving by modifying a routing table.

6. A method of managing a tunnel to provide mobile node mobility when a mobile node moves from a visiting network to a home network which supports a mobile IP, the method comprising:

receiving, by a home agent, a location registration (Binding Update) message from the mobile node which configures a care-of address (CoA);

setting, by the home agent, a tunnel which is already used as a receiving-only tunnel;

transmitting, by the home agent, a location registration completion (Binding Acknowledgement) message to the mobile node; and canceling, by the home agent, the tunnel which is already used as the receiving-only tunnel.

\* \* \* \* \*